(12) United States Patent
Willford

(10) Patent No.: US 11,498,674 B2
(45) Date of Patent: Nov. 15, 2022

(54) AIRCRAFT FLOATS

(71) Applicant: Textron Aviation Inc., Wichita, KS (US)

(72) Inventor: Neal Herbert Willford, Andover, KS (US)

(73) Assignee: Textron Aviation Inc., Wichita, KS (US)

(*) Notice: Subject to any disclaimer, the term of this patent is extended or adjusted under 35 U.S.C. 154(b) by 23 days.

(21) Appl. No.: 16/787,416

(22) Filed: Feb. 11, 2020

(65) Prior Publication Data

US 2021/0171192 A1 Jun. 10, 2021

Related U.S. Application Data

(60) Provisional application No. 62/943,333, filed on Dec. 4, 2019.

(51) Int. Cl.
*B64C 35/00* (2006.01)
*B64C 5/06* (2006.01)
*B64C 25/54* (2006.01)

(52) U.S. Cl.
CPC .............. *B64C 35/008* (2013.01); *B64C 5/06* (2013.01); *B64C 25/54* (2013.01)

(58) Field of Classification Search
CPC ......... B64C 5/06; B64C 25/54; B64C 35/008; B64C 9/00; B64C 2201/021; B64C 25/56; B64C 3/14; B64C 23/00
See application file for complete search history.

(56) References Cited

U.S. PATENT DOCUMENTS

| | | | | |
|---|---|---|---|---|
| 3,159,364 A * | 12/1964 | Sheaffer | ................. | B64C 35/00 244/101 |
| 3,738,598 A * | 6/1973 | Larkin | .................... | B64B 1/005 244/105 |
| 4,698,041 A * | 10/1987 | Dasa | ....................... | A63H 27/00 446/61 |
| 5,415,365 A * | 5/1995 | Ratliff | .................... | B64C 35/00 244/101 |
| 8,272,596 B2 * | 9/2012 | Meekins | ................ | B64C 35/00 244/101 |
| 2008/0302908 A1 * | 12/2008 | Filipek | .................. | B63B 39/061 244/105 |
| 2009/0065632 A1 * | 3/2009 | Cazals | ................... | B64D 27/16 244/15 |
| 2010/0148000 A1 * | 6/2010 | Llamas Sandin | ........ | B64C 1/26 244/87 |
| 2014/0339359 A1 * | 11/2014 | Jeute | ....................... | B64C 25/66 244/101 |
| 2015/0321757 A1 * | 11/2015 | DiClemente | .......... | B64C 35/001 244/106 |

(Continued)

OTHER PUBLICATIONS

Sadraey, "Tail Design" (Year: 2012).*

(Continued)

*Primary Examiner* — Assres H Woldemaryam
(74) *Attorney, Agent, or Firm* — Avek IP, LLC

(57) ABSTRACT

Disclosed is a system for an amphibious aircraft where floats on each side of the aircraft include aerodynamic structures. The structures are configured to compensate for aerodynamic imbalances (e.g., in yaw and pitch) created by the incorporation of the floats onto the aircraft.

18 Claims, 19 Drawing Sheets

(56) References Cited

U.S. PATENT DOCUMENTS

2017/0043866 A1* 2/2017 Sakurai .................. B64C 25/58
2019/0168873 A1* 6/2019 Wiplinger .............. B64D 37/16

OTHER PUBLICATIONS

Tail Design—Aircraft Design—Wiley Online Library date (Year: 2012).*
Pilotfriend, "Flying Seaplanes, Seaplanes Characteristics," http://www.pilotfriend.com/training/flight_training/seaplanes/char.htm, 2008.
Gudmundsson, Snorri; "General Aviation Aircraft Design," Appendix C3: Design of Seaplanes, 2013.

* cited by examiner

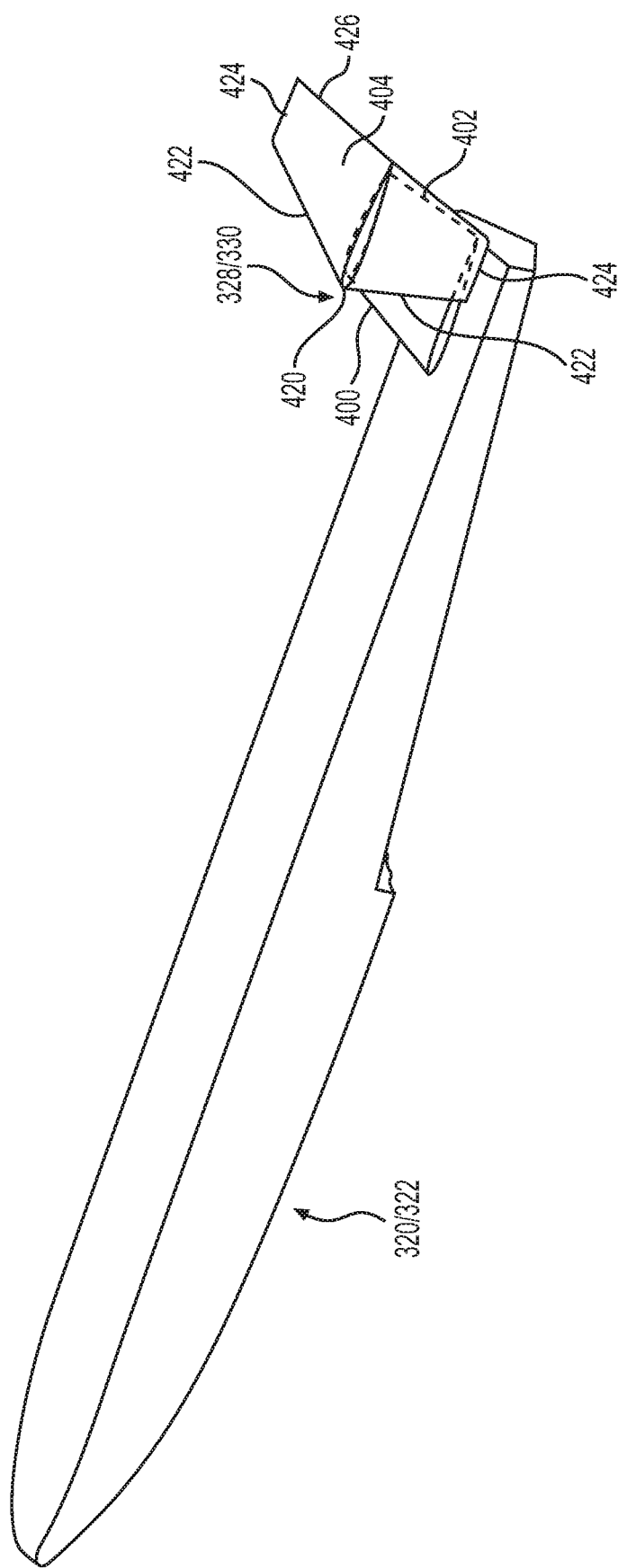

AIRCRAFT FLOATS

CROSS-REFERENCE TO RELATED APPLICATIONS

This application claims the benefit of U.S. Provisional Patent No. 62/943,333 filed Dec. 4, 2019, the entire contents of which are hereby incorporated by reference.

BACKGROUND OF THE INVENTION

1. Field

The disclosed embodiments relate generally to the field of aircraft, more specifically, floatplane designs.

2. Description of the Related Art

Floatplanes are generally aircraft adapted for water in a variety of ways. Some of these varieties include an aircraft equipped with tandem floats instead of wheels (like with land-based aircraft). The floats provide buoyancy allowing for the aircraft to remain upright in the water. The water-engaging underside of each float is also configured to both enable the aircraft to stay above water while not in operation, but also to, when the aircraft is in motion on the water, avoid drag and operate as a hydrofoil, ultimately lifting the aircraft out of the water once the aircraft reaches adequate forward speed.

Most commonly, the floats are simply added to a conventional land aircraft design already in use. When the floats are added to such a design, it creates moderate aerodynamic instability. This instability is created due to destabilizing aerodynamic forces caused by the floats in relation to the overall aircraft center of gravity. Conventionally, modifications to an aircraft's tail section have been used to compensate for the aerodynamic changes resulting from the introduction of the floats into the overall aircraft design.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

Embodiments include a float for an aircraft having an aerodynamic structure mounted onto an elongated member. In embodiments, the aerodynamic structure is configured to aerodynamically compensate for an aerodynamic imbalance created by an incorporation of the float onto the aircraft, and in embodiments, the aerodynamic structure is mounted on an upper surface of the float. The structure, in embodiments, is located at the rear of the float. The structure can be centered and also can extend upward and be substantially centered at the rear of the float. The structure can include outwardly angled fin-like structures, e.g., a single or a pair, and the fins can extend out from the rear edges of the upper surface. In embodiments, a single fin can be angled in an outboard direction. In other embodiments, the structure has both a substantially vertical member and a substantially horizontal member.

In yet other embodiments, the at least one aerodynamic structure is configured to be symmetrical relative to a second aerodynamic structure which is angled in a second outboard direction on a second float mounted on an opposite side of the aircraft.

In embodiments, the float includes a hydrofoil undersurface configuration. For example, the float might include a bow; a stern; a substantially flat top; upper, inwardly tapered sides; lower sides which are concavely tapered upward and outward from a forward keel; a substantially flat rear; a skeg; and rearwardly converging lower surfaces meeting to meet at a rearward keel. In this embodiment, each of the lower sides and lower surfaces configured to reduce drag when the aircraft is moving in water, and to provide lift out of the water during a takeoff.

In embodiments, the aerodynamic structure has a vertical component configured to compensate for a yaw instability of the aircraft created by the addition of the float to an aircraft. The structure can also have a horizontal component configured to compensate for a pitch instability of the aircraft created by the addition of the float to an aircraft. Alternatively, the structure can include an angled fin, where the fin is angled to an extent that a balance is created between yaw and pitch instabilities in the aircraft. Two outwardly-angled fins could be used where they are angled upward at an angle creating a balance between yaw and pitch instabilities.

In other embodiments, a system for an amphibious aircraft is provided where the system includes a first float configured for attachment to a first side of the aircraft; a first aerodynamic structure mounted on the first float; a second float configured for attachment to a second side of the aircraft; a second aerodynamic structure mounted on the second float; and the first and second aerodynamic structures together being configured to compensate for aerodynamic imbalances created by incorporation of the first and second floats onto the aircraft. In embodiments, the first float and first aerodynamic structures are symmetrical to the second float and second aerodynamic structures. In further embodiments, the first and second aerodynamic structures are tapered upward and swept back. The structures, in embodiments, can be: (i) vertical fins; (ii) T-shaped; (iii) V-shaped fin pairs on each of the first and second floats; or (iv) single, outwardly-angled fins, one on each of the first and second floats.

A floatation system for supporting an aircraft on water is also disclosed. This system, in embodiments, includes a pair of symmetrical elongated members, each of said members having an undersurface configuration for engaging water; each elongated member also having an aerodynamic structure mounted on an exterior surface of the elongated member, the aerodynamic structure being configured to compensate for at least one aerodynamic parameter created by the existence of the elongated members.

BRIEF DESCRIPTION OF THE SEVERAL VIEWS OF THE DRAWINGS

Illustrative embodiments are described in detail below with reference to the attached drawing figures, which are incorporated by reference herein and wherein:

FIG. 4A shows a perspective view of a float utilized in the second embodiment;

DETAILED DESCRIPTION

Figure 1A:
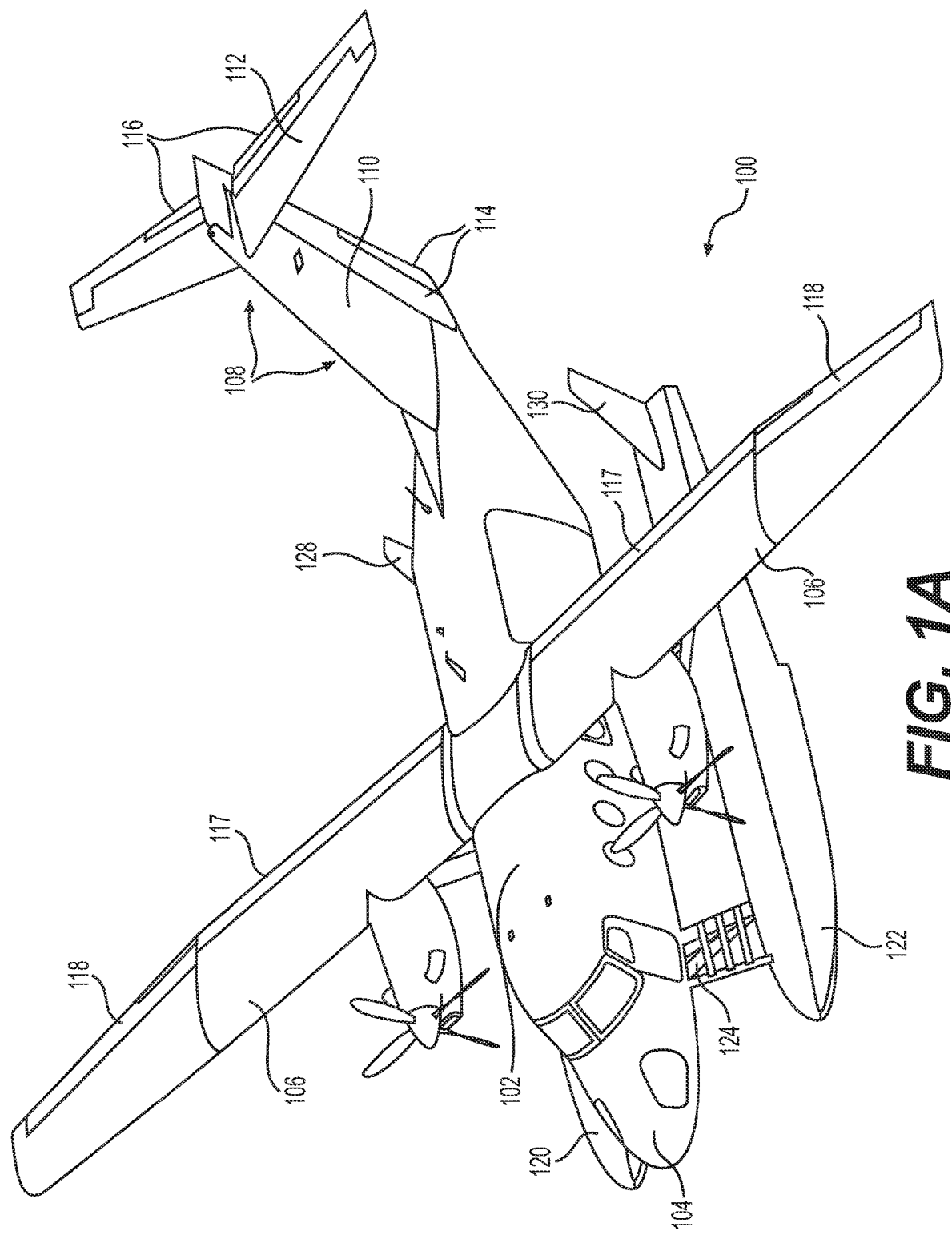
FIGS. 1A and 1B show different perspective views for a first disclosed embodiment.
Figure 1B:
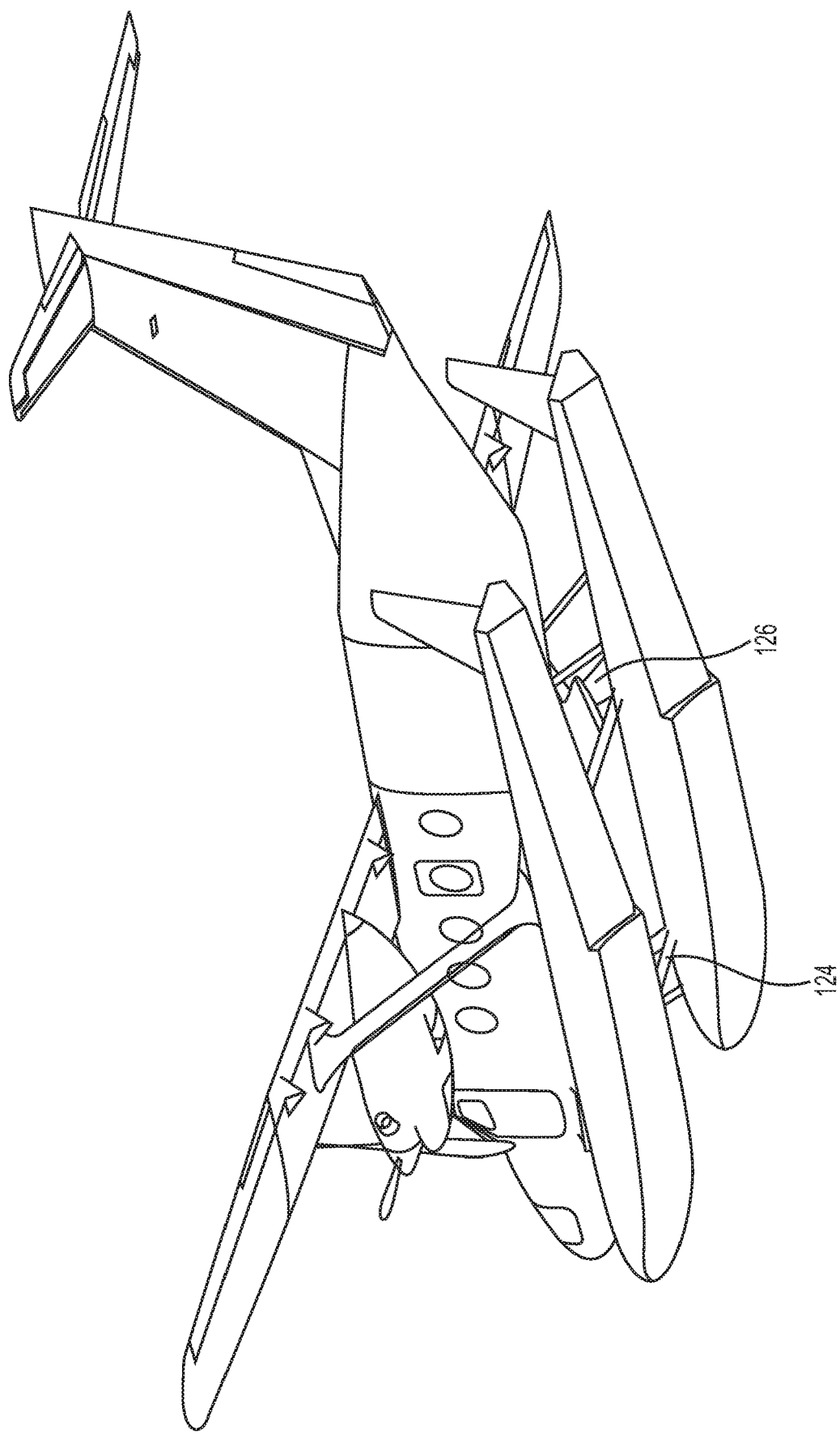
Figure 1C:
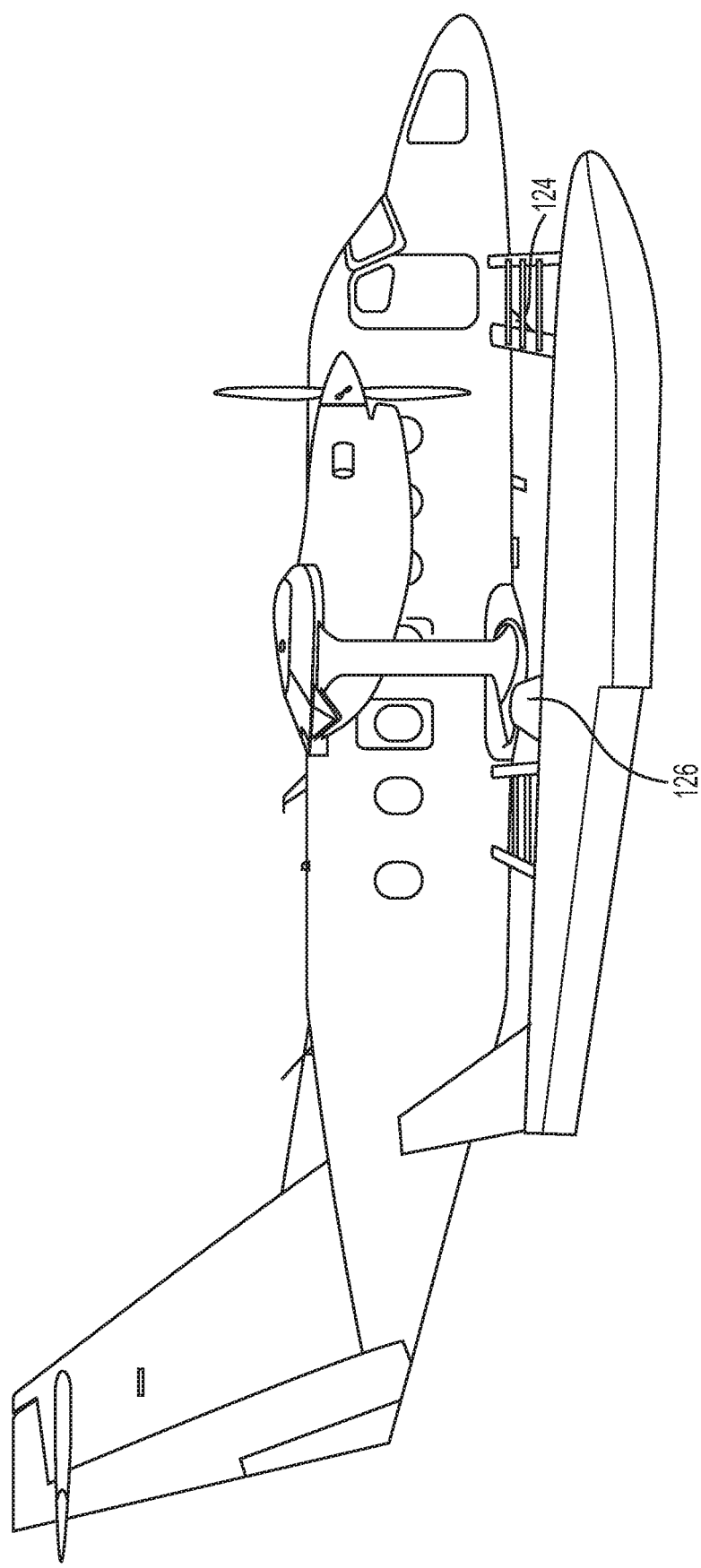
FIG. 1C shows a first side view of the first embodiment.
Figure 1D:
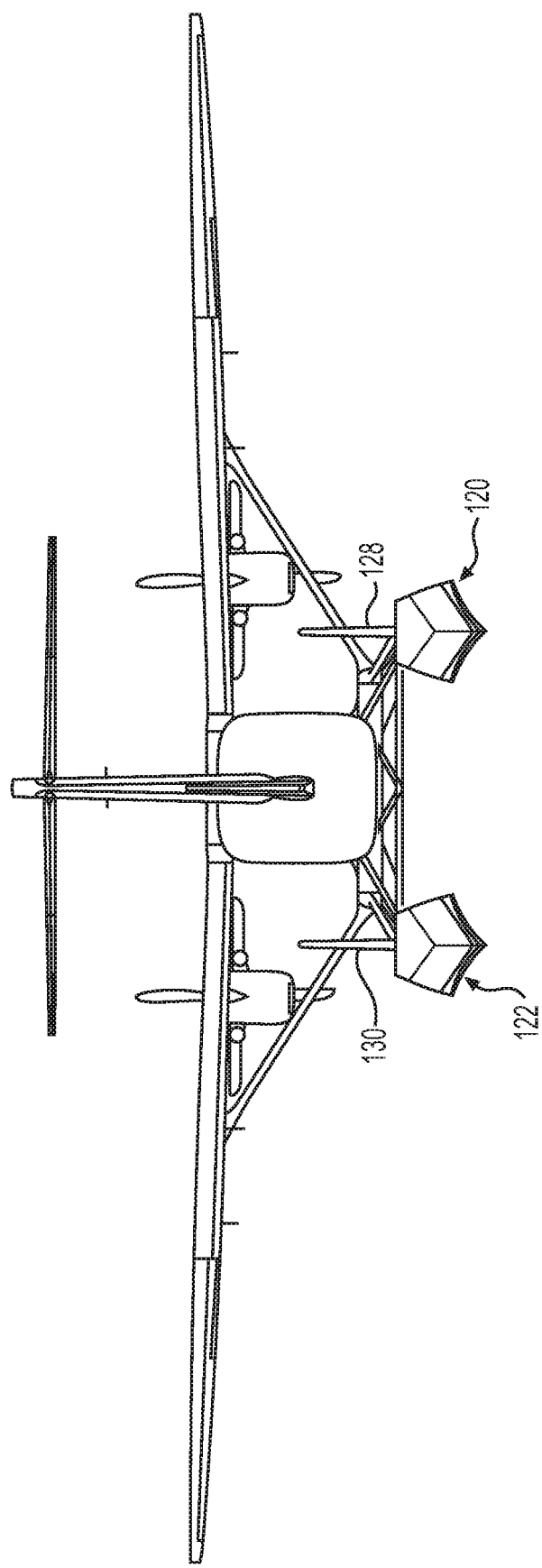
FIG. 1D shows a rear view of the first embodiment.
Figure 1E:
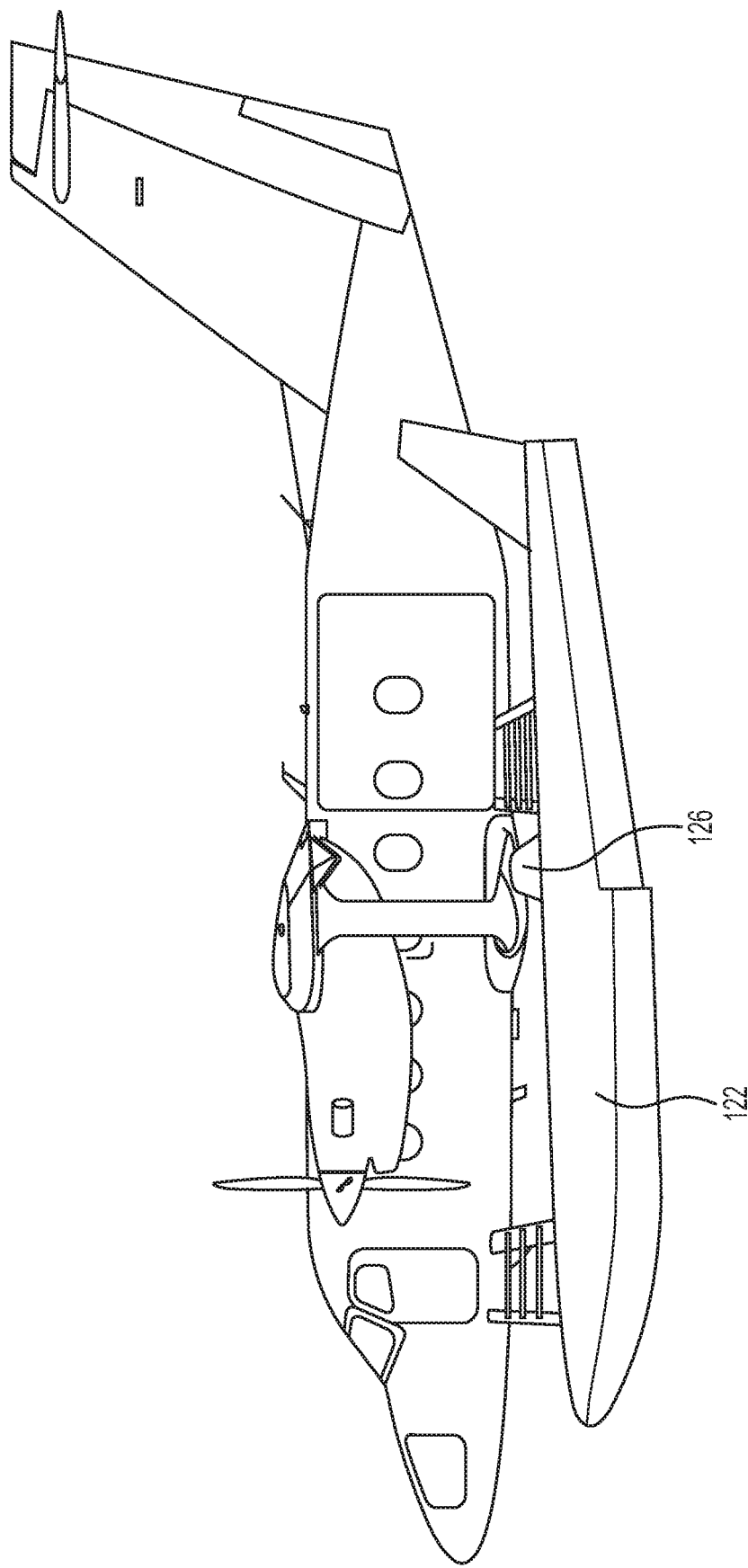
FIG. 1E shows a second side view of the first embodiment.

Embodiments provide systems and a method for creating an overall aerodynamic improvement in the implementation of floatation devices onto an aircraft for the purpose of making said aircraft capable of taking off, landing, and being maintained on bodies of water.

An example aircraft 100 incorporating the disclosed innovations is represented in FIGS. 1A-E. Referring to the figures, it can be seen that the aircraft includes a fuselage 102, nose 104, wings 106, and a tail section 108. Those skilled in the art will recognize that with the typical aircraft, the tail section 108 will be configured having vertical and horizontal stabilizers 110 and 112. A rudder system 114 exists on the vertical stabilizer, making for aerodynamic control in yaw. An elevator system 116 exists on the horizontal stabilizer 112 providing control in pitch. Inboard flaps 117 serve to provide lift or drag. Outboard flaps 118 (or "ailerons") on the wings 106 provide control regarding roll. In the disclosed embodiment, the aircraft 100 shown is one capable of alternatively including retractable wheels enabling the aircraft to take off and land on ground surfaces. But in the disclosed embodiment 100, a right hand float 120 and a left hand float 122 have been added to enable the aircraft to be adapted for water. The floats 120 and 122 are each attached to the fuselage via forward and rearward struts 124 and 126.

Because the floats are heavier than the landing gear and wheels of the ground-based aircraft, the empty weight of the aircraft is greater than before. Additionally, the stability of the aircraft is ordinarily impacted in any, some or all three rotational directions.

In the disclosed embodiment, the rear of each of the right and left floats 120 and 122 have been modified to include aerodynamic control structures. As can be seen in the FIGS. 1A-E configuration, each of floats 120 and 122 includes an upwardly-extending vertical devices (e.g., members 128 and 130). Each aerodynamic control member is provided to compensate for instability created in the aerodynamics of the aircraft due to the addition of the floats. In some configurations, the addition of the floats creates horizontal instability (yaw). Thus, the aerodynamic control structures 128 and 130 serve to weigh against this instability in addition to the already existing structures (e.g., vertical stabilizer 110 along with the rest of the overall configuration for aircraft 100). Fin 130 can be properly sized to reduce or eliminate the yaw instability caused by the float, thereby eliminating the additional vertical fins attached to the fuselage tailcone or empennage normally used to address the float yaw instability.

Figure 2A:
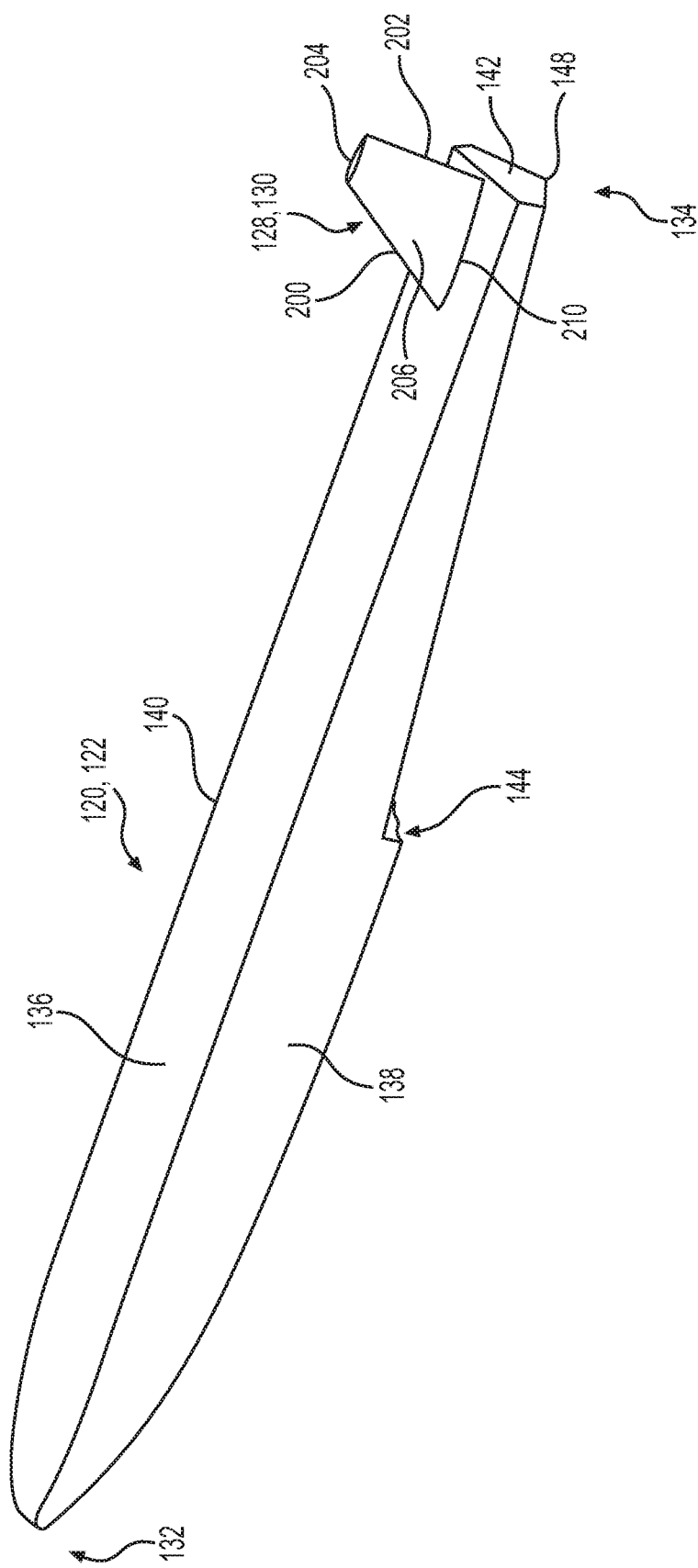
FIG. 2A shows a perspective view of a float utilized in the first embodiment.
Figure 2B:
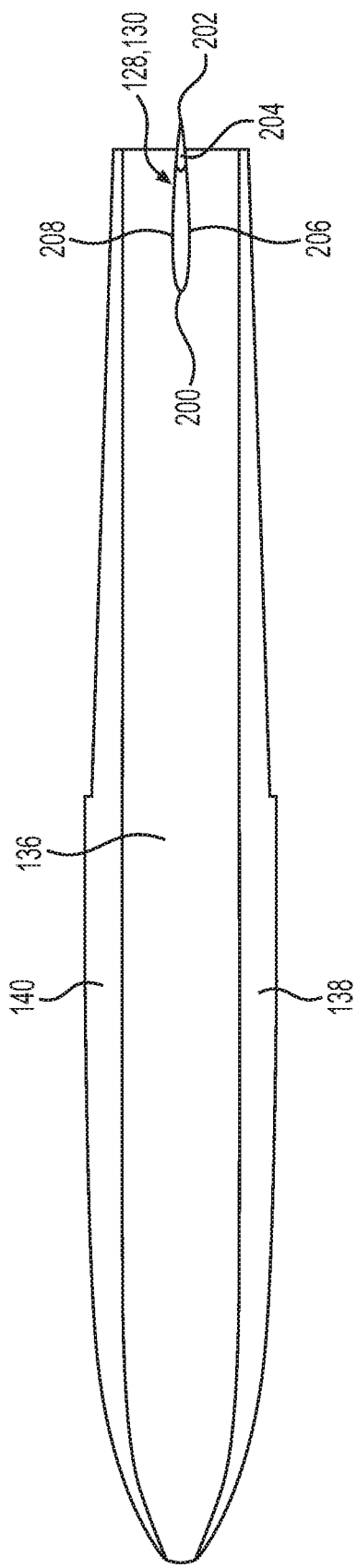
FIG. 2B shows a top view of the float utilized in the first embodiment.
Figure 2C:
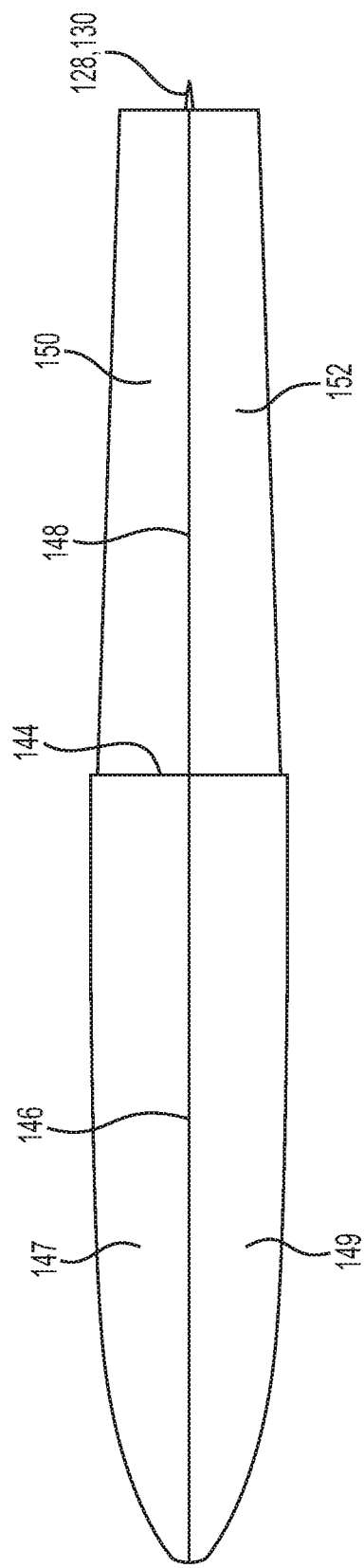
FIG. 2C shows a bottom view of the float utilized in the first embodiment.
Figure 2D:
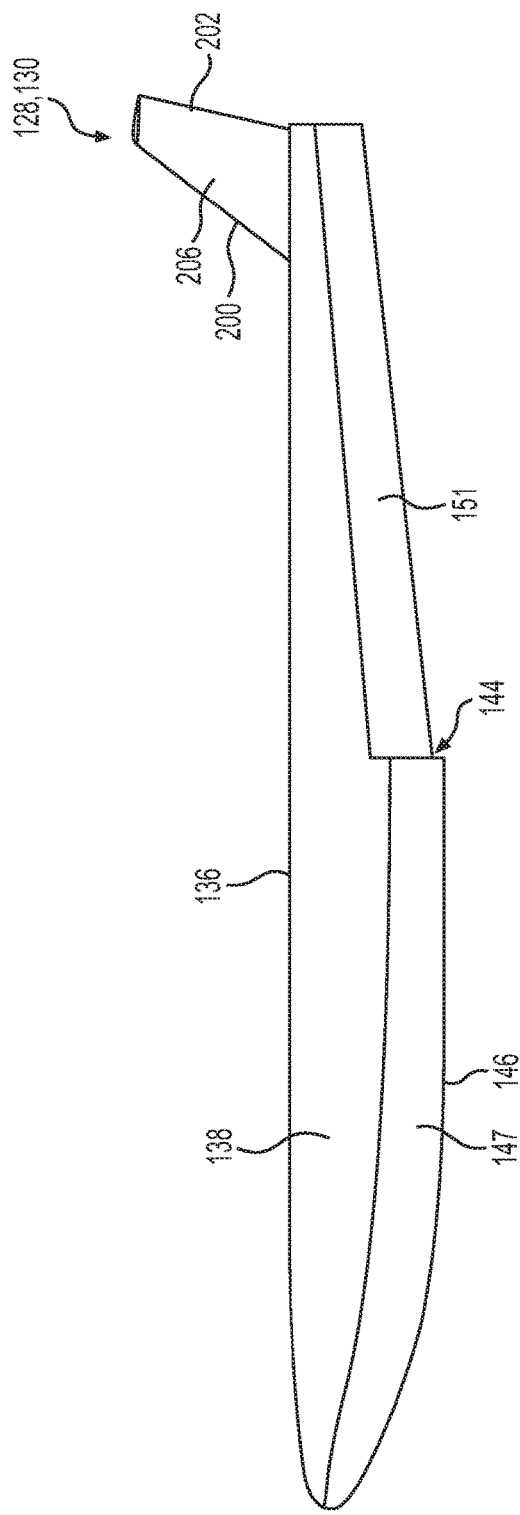
FIG. 2D shows a side view of the float utilized in the first embodiment.
Figure 2F:
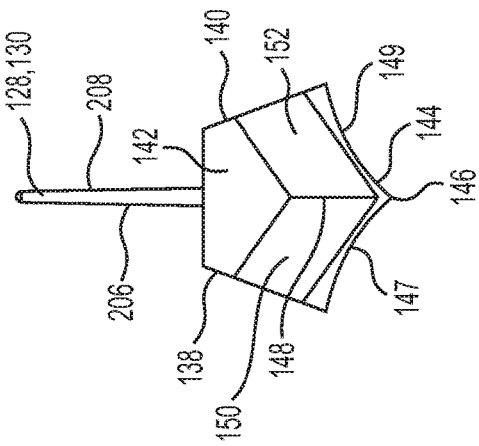
FIG. 2F shows a rear view of a float utilized in the first embodiment.
Figure 2E:
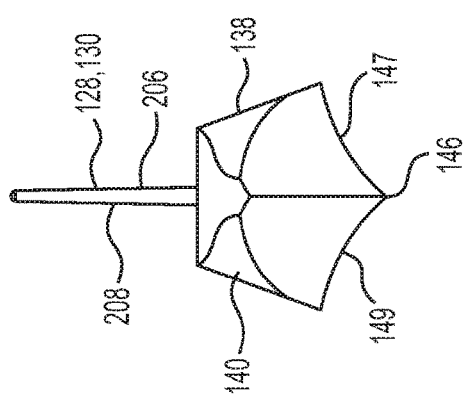
FIG. 2E shows a front view of the float utilized in the first embodiment.

FIGS. 2A-F show the details regarding both of floats 120 and 122. Referring first to FIG. 2A, it can be seen that the disclosed embodiment for each of the floats include: (i) a bow 132; (ii) a stern 134, (iii) a substantially flat top 136 (from which hardware and other devices used to connect to the forward and rearward struts 124 and 126 of the aircraft have been removed for the sake of simplicity), (iv) upper, inwardly tapered sides 138 and 140 (see also FIG. 2B-2F); (v) lower sides 147 and 149, each of which is concavely tapered upward and outward from a forward keel 146; (vi) a flat rear 142; (vii) a skeg 144 (see also FIG. 2C); and (viii) lower surfaces 150 and 152 rearwardly-converging to meet at a rearward keel 148. As is known in the art, the undersurface arrangement including bow 132, stern 134, lower sides 147 and 149, forward keel 146, skeg 144, and lower surfaces 150 and 152 are collectively and independently designed to, i.e., reduce drag while in the water, and provide lift out of the water on a takeoff.

FIGS. 2A-F also reveal a geometric configuration for the aerodynamic control structures 128 and 130 of the floats 120. As can be seen, the identical structures 128 and 130 each comprise symmetrical airfoils have a leading edge 200, a trailing edge 202, and a flat top 204, and are defined by a first side 206 and a second side 208. The structures (airfoils) are swept backwards slightly, and are tapered going from a camber line at a base 210 and an uppermost camber line at the top 204.

In embodiments, the configurations shown in FIGS. 1A-E and FIGS. 2A-F, as well as the yet to be discussed embodiments disclosed hereinafter, enable either wheels or floats to be used without aerodynamically modifying the configuration of the aircraft. As discussed above, the floats have historically been designed primarily with a focus towards improved hydrofoil functions. Here, however, the aerodynamic structural modifications made help minimize or eliminate the negative impact the floats have upon overall aircraft function. For example, the addition of aerodynamic devices 128 and 130 cancel out yaw instabilities created by the addition of the floats 120 and 122.

Figure 3:
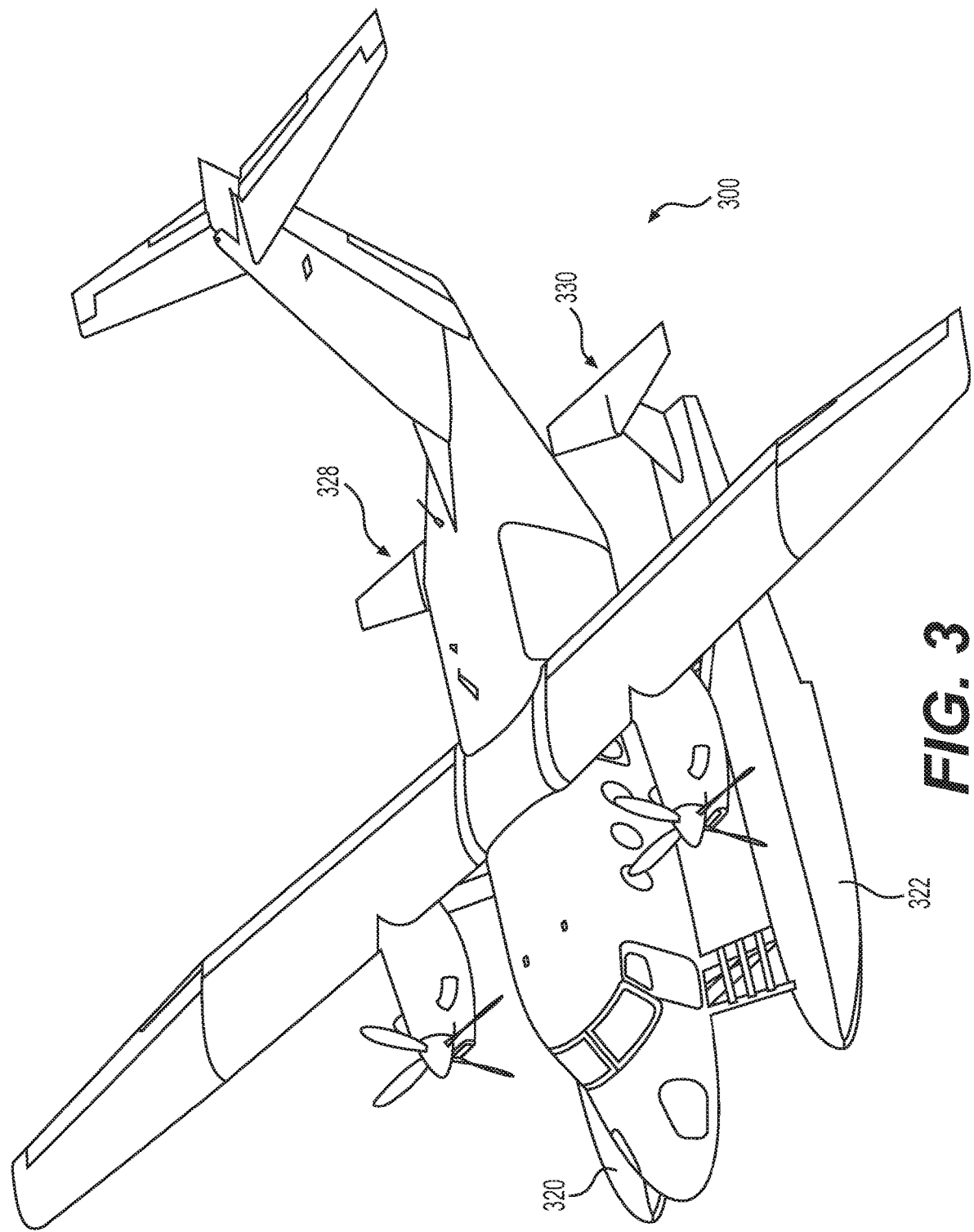
FIG. 3 shows a perspective view for a second disclosed embodiment.
Figure 4B:
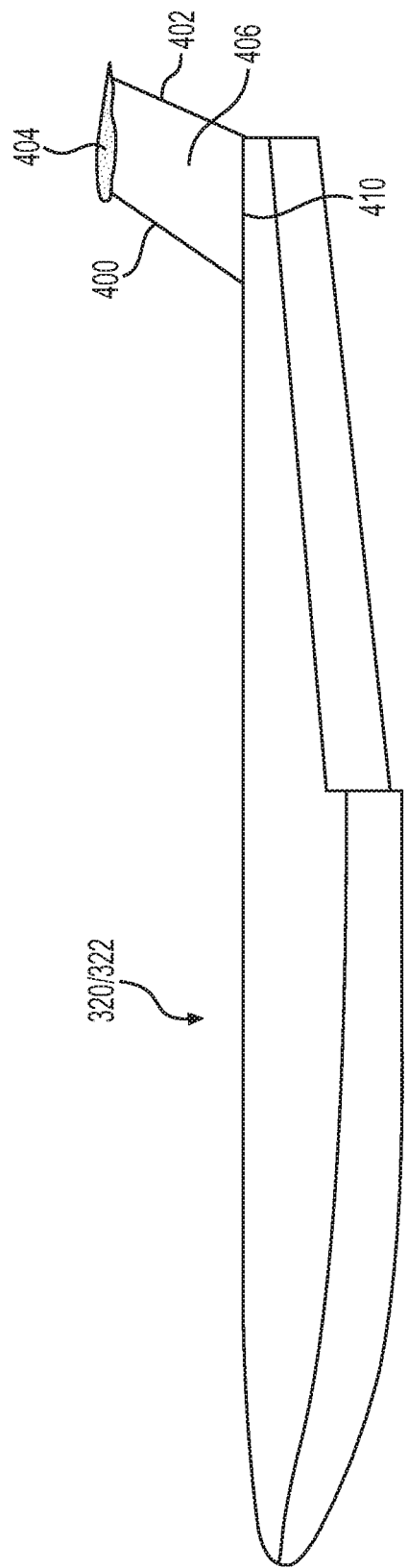
FIG. 4B shows a side view of the float utilized in the second embodiment.
Figure 4D:
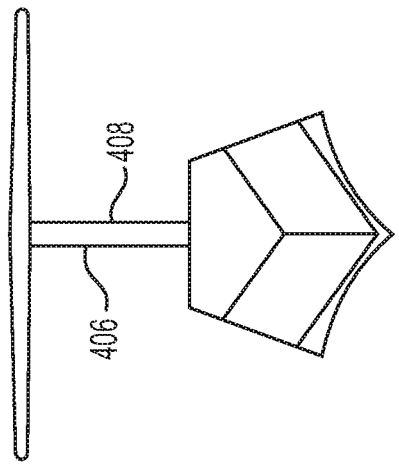
FIG. 4D shows a rear view of the float utilized in the second embodiment.
Figure 4C:
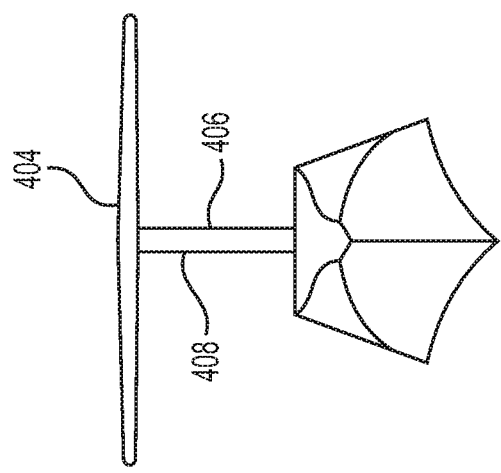
FIG. 4C shows a front view of the float utilized in the second embodiment.

A second embodiment can be seen in FIGS. 3 and 4A-D. In FIG. 3, the aircraft 300 includes right and left floats, 320 and 322 respectively. This embodiment, however, utilizes T-shaped aeronautical structures 328, 330 mounted on top of the floats 320 and 322 in the same general manner as disclosed for the first embodiment. Here, however, instead of the existence of only a vertically upwardly extending member (e.g., see structures 128 and 130 in FIG. 1A), a horizontal aerodynamic structural component 404 (see FIGS. 4A-D for details) completes the T-shape. The horizontal aerodynamic structural component 404 extends laterally outward from the top of a vertical component 405. This vertical member 405 has a leading edge 400 and a trailing edge 402 and first and second sides, 406 and 408. The tapering existing between top and base camber lines for the vertical member 405 is less dramatic that exists in the structures of the vertical members 128 and 130 in the first embodiment (compare FIG. 4B to FIG. 2D). The horizontal member 404 has a V-tip 420 which extends out slightly over the top of leading edge 400. From there, the upper member 420 has dual, rearwardly-swept edges 422 which extend out to lateral edges 424. Lateral edges 424 each extend back to a common rearward edge 426, which, in the disclosed embodiment, is substantially or precisely linear.

Figure 5:
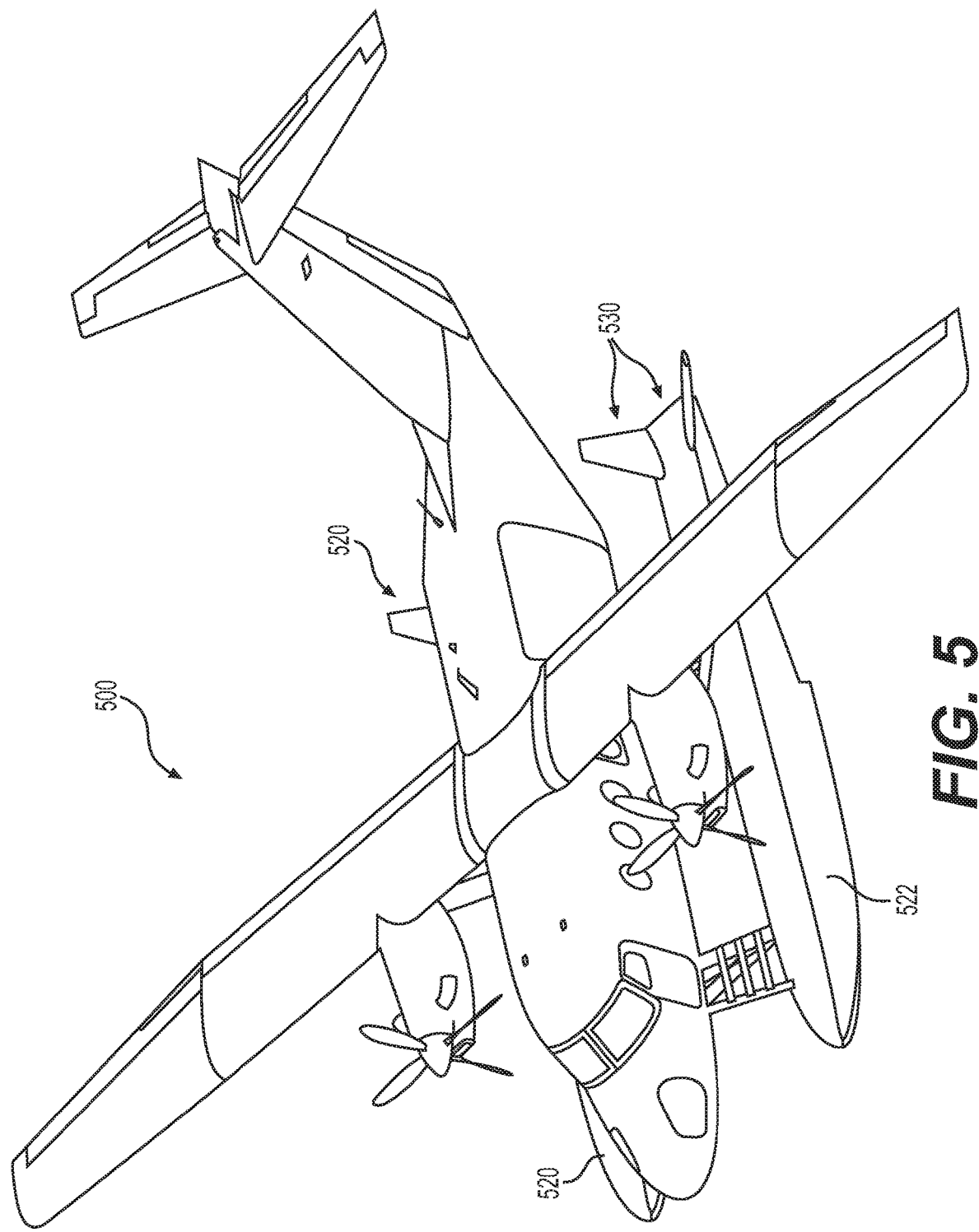
FIG. 5 shows a perspective view for a third disclosed embodiment.

The horizontal fin 404 is added to reduce or eliminate the aerodynamic pitch instabilities caused by the float. A third embodiment can be seen in FIGS. 5 and 6A-D. In FIG. 5, the aircraft 500 includes right and left floats, 520 and 522 respectively. This embodiment, however, utilizes symmetrical, outwardly-angled aeronautical structural pairs 528, 530, one pair mounted on top of each of the floats 520 and 522.

Instead of using structures having vertical or horizontal components, these structural pairs 528 and 530, (referring to FIGS. 6A-D) each include a first airfoil 640 mounted substantially at the rear of a first edge 542 of the float, and a second airfoil 544 mounted at the rear of an opposite edge 546 of the float. Like with the single vertical embodiment of FIGS. 2A-F, the angled members 640 and 644 each have leading and trailing edges, 600 and 602, and first and second sides, 606 and 608. The tapering existing between top and base camber lines for each angled member (e.g., members 640 and 644) are similar to what was disclosed for vertical members 128 and 130 in the first embodiment (compare FIGS. 6A and 6B to FIG. 2D).

The amount of angle that the fin has is dependent on balancing the fin size with how much of the effective vertical and horizontal components are needed to counter the instability caused by the floats. It could vary from installation to installation. For example, for embodiments where the addition of the floats creates instability in pitch and/or yaw, the artisan may change the angling, size of added aerodynamic devices, etc. As a general rule, the size of the aerodynamic devices added will be selected to counter a magnitude of instability created by the floats, and the extent created in a horizontal dimension, or verticality, will be selected based on the instability the floats have created in pitch or yaw, respectively.

Figure 6A:
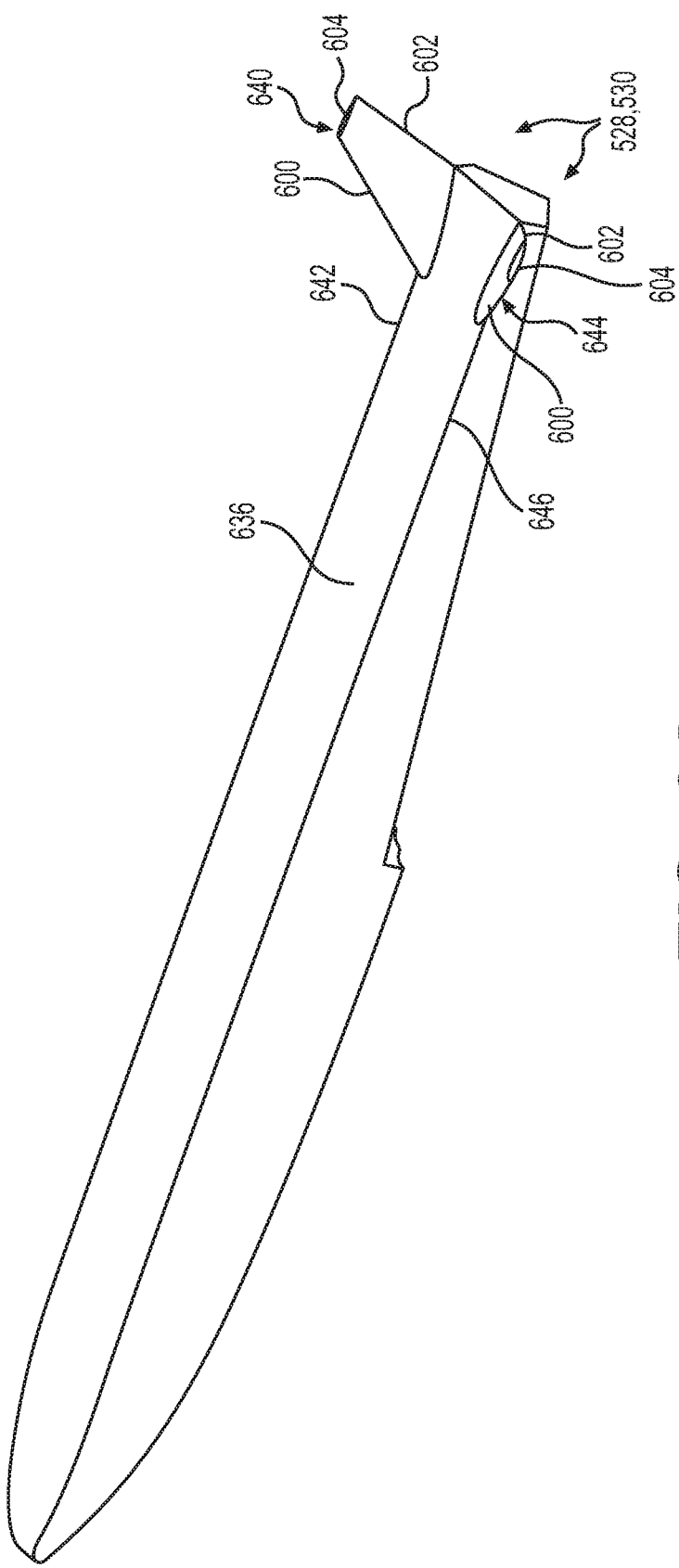
FIG. 6A shows a perspective view of a float utilized in the third embodiment.
Figure 6B:
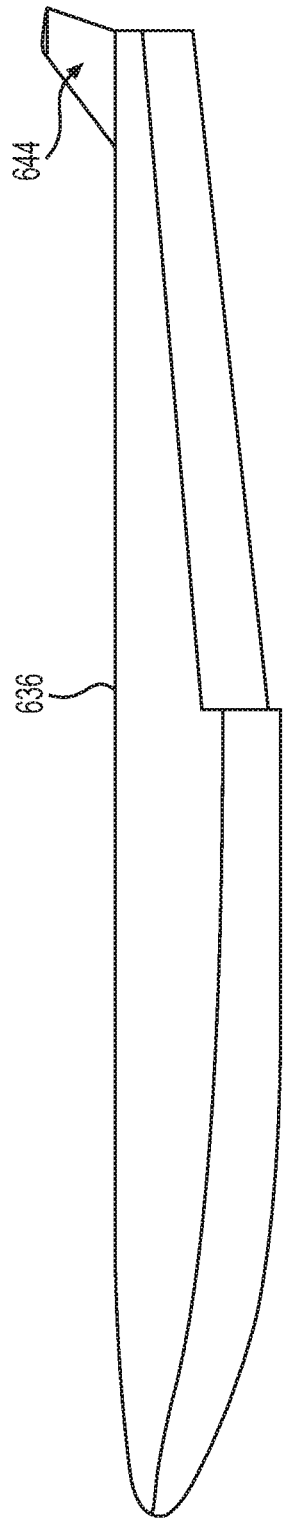
FIG. 6B shows a side view of the float utilized in the third embodiment.
Figure 6D:
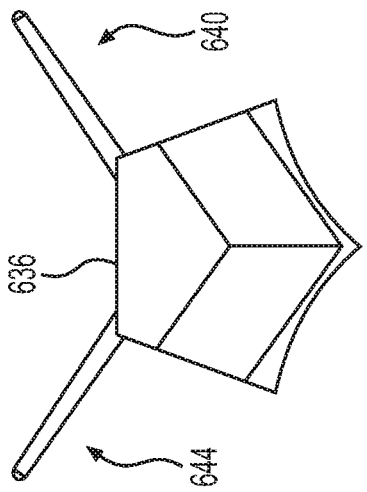
FIG. 6D shows a rear view of the float utilized in the third embodiment.
Figure 6C:
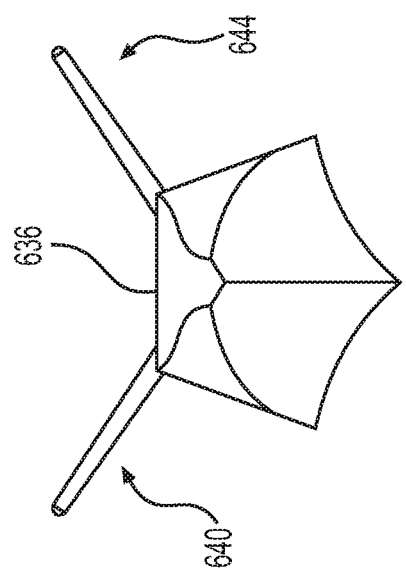
FIG. 6C shows a front view of the float utilized in the third embodiment.

In the cross sections of FIGS. 6C and 6D, is can be seen that each of the members 640 and 644 are angled relative to the flat upper surface of the float (e.g., a substantially horizontal plane) at some angle between zero and 90 degrees. The desired aerodynamic contributions of the separate vertical and horizontal fins can be combined into a pair of fins on each float inclined to form a "V" shape (see FIG. 5), or into a single large canted fin on each float (see FIG. 7). Here, in the FIG. 6 embodiment, the size of the angled aerodynamic devices added will be selected to counter a magnitude of instability created by the floats. The extent of the angling of members 640 and 644 can be selected depending on the relative instability in terms of pitch or yaw. For example, where the instability created by the floats is relatively higher in a pitch dimension, members 640 and 644 might be made to be more flat relative to upper surface 636 (more obtuse relative to one another). But if the instability created is more in a yaw dimension, members 640 and 644 might be more raised than flat (more acutely angled relative to one another).

Figure 7:
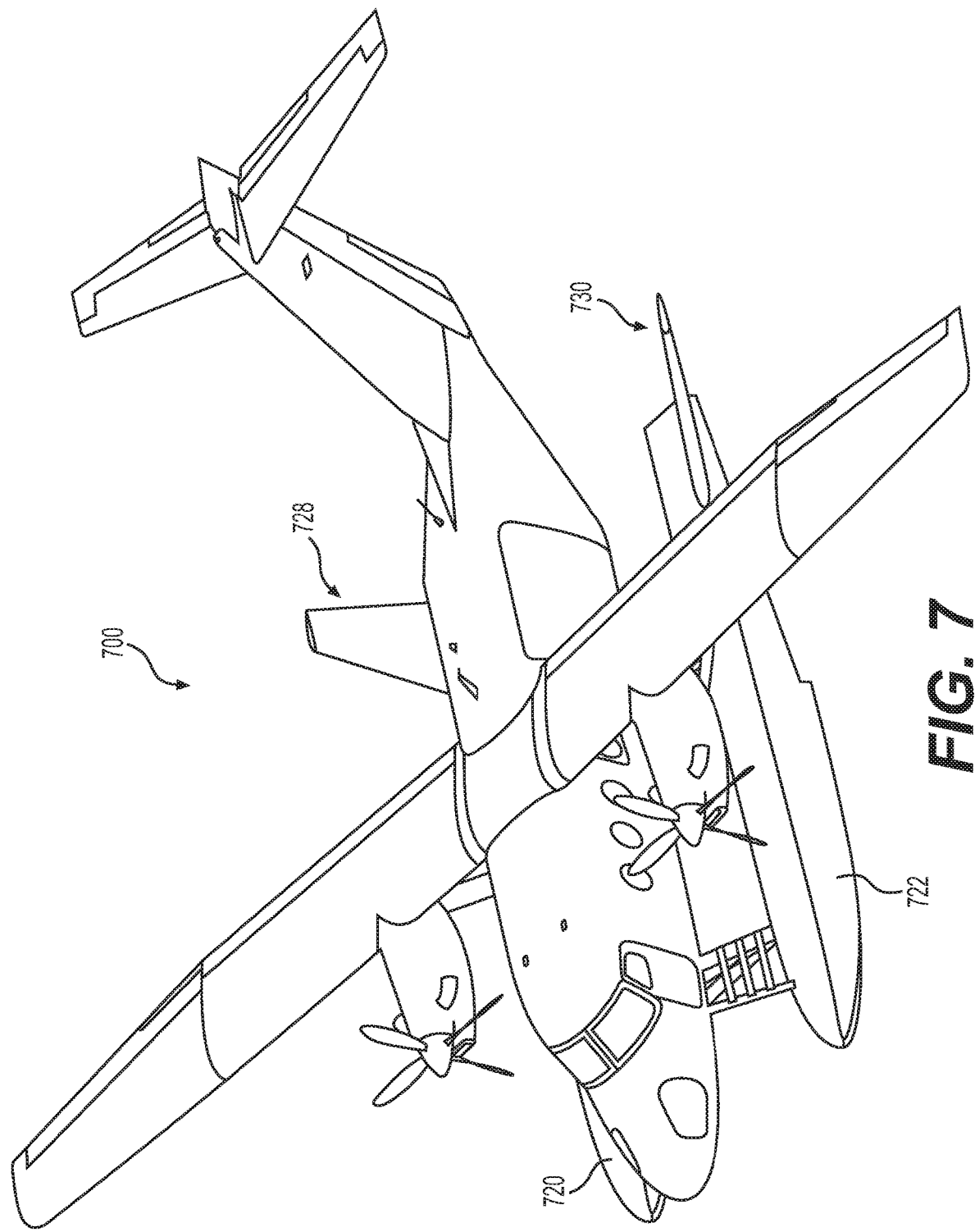
FIG. 7 shows a perspective view for a fourth disclosed embodiment.

A fourth embodiment can be seen in FIGS. 7 and 8A-D. Referring to FIG. 7, it can be seen that an aircraft 700 includes right and left floats, 720 and 722 respectively. This embodiment, instead of using V-shaped pairs like in the embodiment of FIGS. 5 and 6A-D, utilizes single outwardly angled aerodynamic structures 728 and 730, one on each of the floats 720 and 722.

Figure 8A:
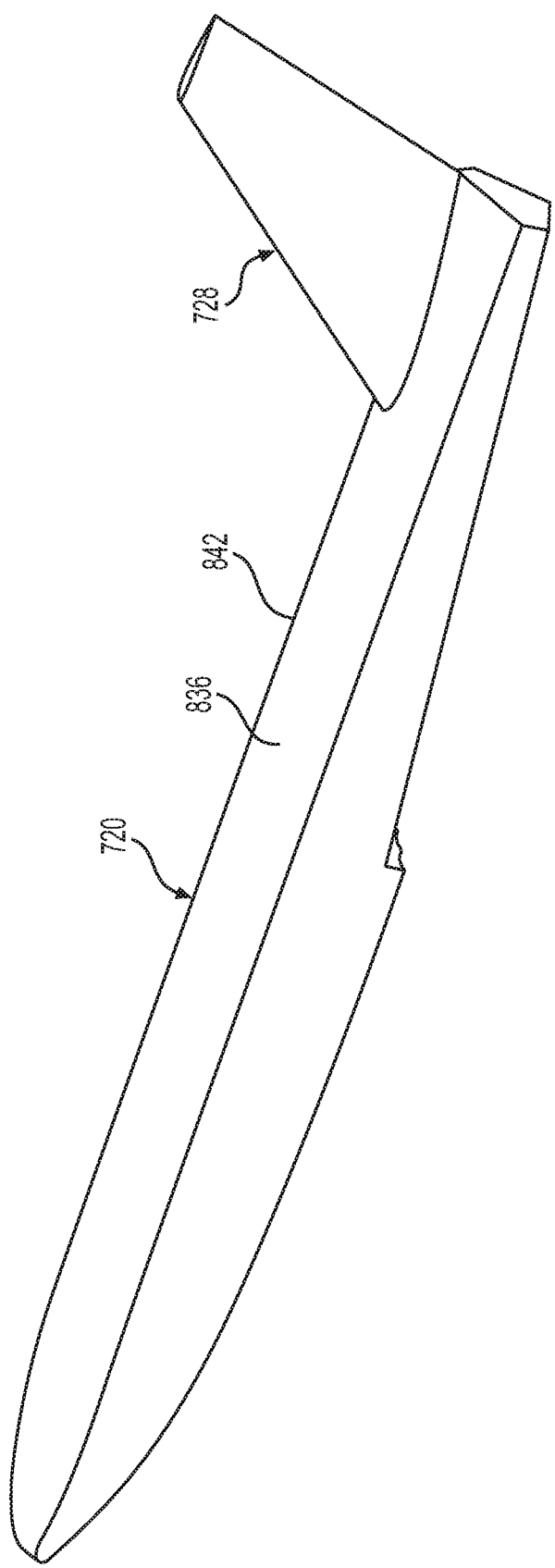
FIG. 8A shows a perspective view for a right float utilized in the fourth embodiment.
Figure 8B:
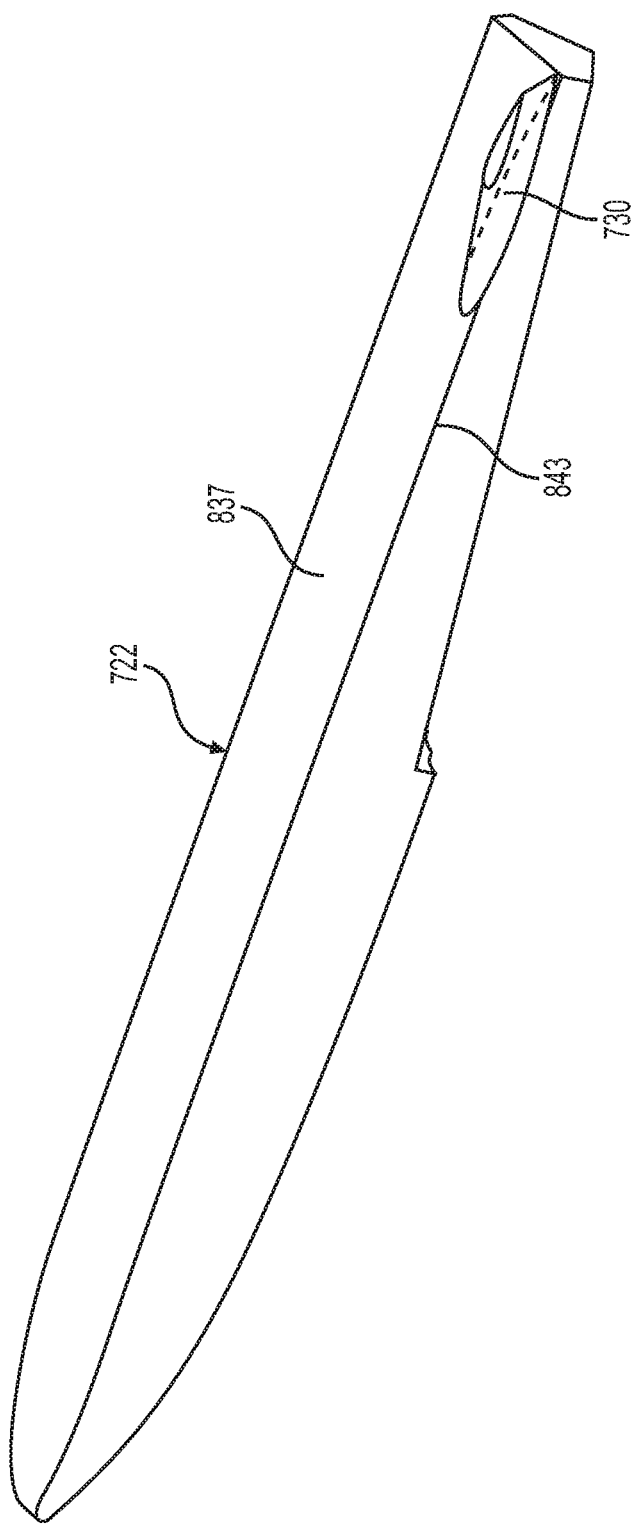
FIG. 8B shows a perspective view for a left float utilized in the fourth embodiment.
Figure 8D:
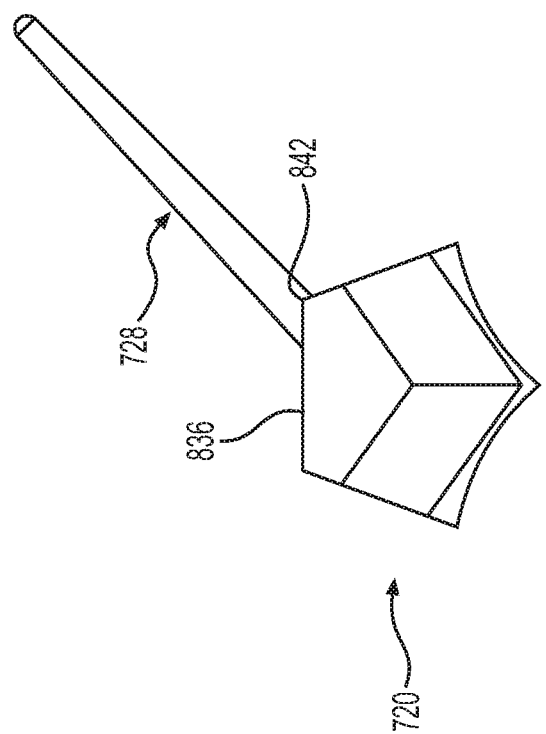
FIG. 8D shows a rear view of the right float utilized in the fourth embodiment.
Figure 8C:
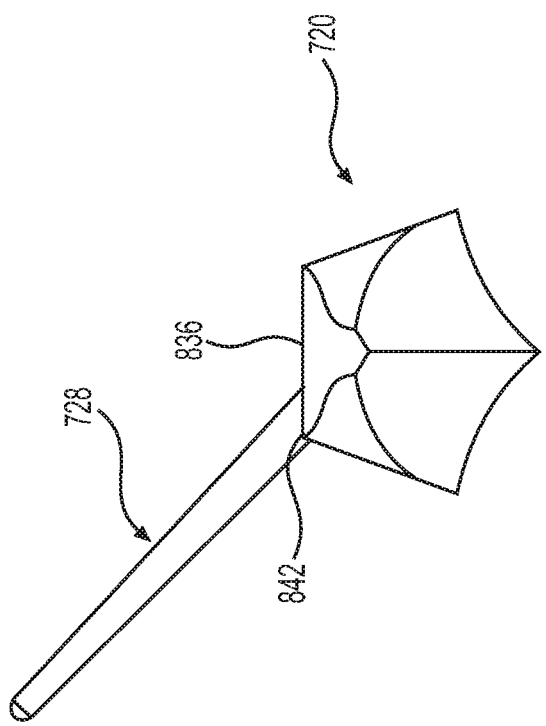
FIG. 8C shows a front view of the right float utilized in the fourth embodiment.
Figure 8C:
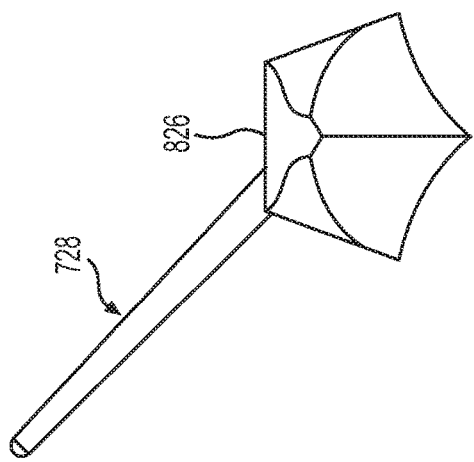
Figure 8D:
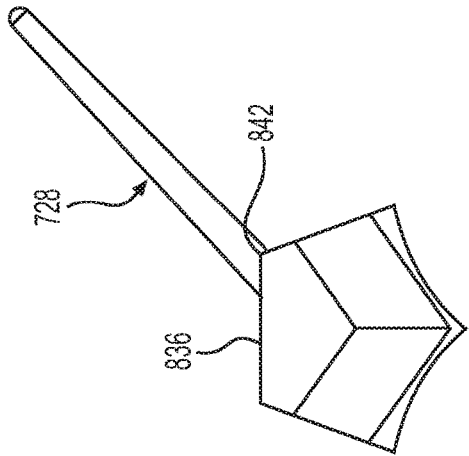
Figure 8E:
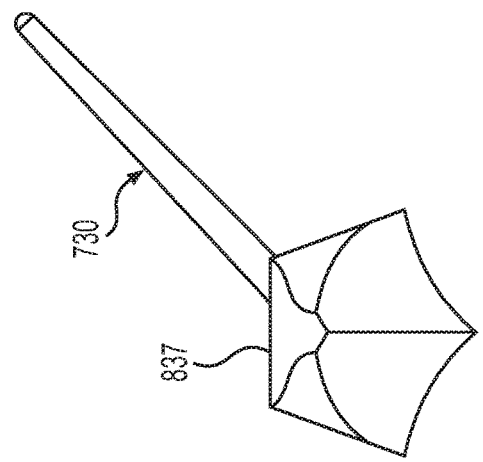
FIG. 8E shows a front view of the left float utilized in the fourth embodiment.
Figure 8F:
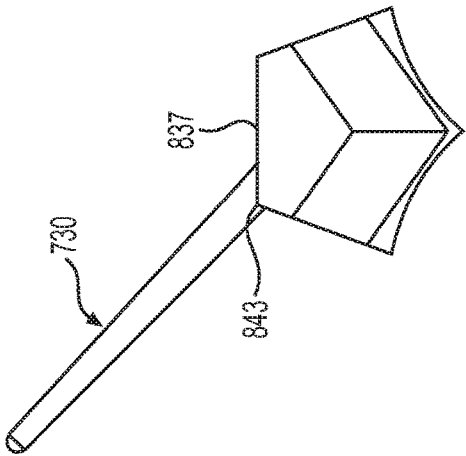
FIG. 8F shows a rear view of the left float utilized in the fourth embodiment.

Referring to FIGS. 8A-E, the float constructions can be seen in more detail. FIG. 8A discloses the details in perspective of right float 720 having an added airfoil member 728, whereas FIG. 8B similarly discloses the details of left float 722 having an added airfoil member 730. In the disclosed embodiments, airfoil member 728 is mounted at a rearward outer edge 842 of an upper surface 836 of the right float 720 (see FIG. 8A), and airfoil member 730 is mounted at a rearward outer edge 843 on an upper surface 837 of the left float 722 (see FIG. 8B). Both airfoils 728 and 730 are tapered much like the tapering described for the first and third embodiments (FIGS. 1 and 5). But the overall size of the airfoils 728 and 730 are larger than those disclosed in the airfoil pairs embodiment in FIG. 5.

The FIG. 7 embodiment reveals floats 720 and 722 which are not identical on each side of the aircraft 700, but the two are symmetrical about the center axis of the aircraft 700.

A difference in angling also exists, in that the cross sections of FIGS. 8C-F reveal that the airfoils 728 and 730 are angled relative to the substantially horizontal flat upper surfaces 836 and 837 (respectively).

Again here, the relative angling of members 728 and 730 can be selected depending on the relative instability in terms of pitch or yaw. For example, where the instability created by the floats is greater in a pitch dimension, members 728 and 730 might be made to be more flat relative to upper surfaces 836 and 837 (more obtuse relative to one another). But if the instability created is more in a yaw dimension, members 728 and 730 might be more raised than flat (more acutely angled relative to one another).

In general, the embodiments disclosed in the figures as well in the discussions above provide a floatation system for supporting an aircraft on bodies of water. The elongated symmetrical float members used, e.g., floats 120, 122, 320, 322, 520, 522, 720, and 722 are each not only adapted to handle hydrodynamic considerations (e.g., the undersurfaces of each member are configured to act in both reducing drag in water, as well as lift when the aircraft is in motion), but also include aerodynamically active structures intended to compensate for negative aerodynamic impacts resulting from the addition of floats.

It should be noted that vertical, T-shaped, tandem V-shaped, and outwardly-angled member embodiments are all disclosed, but those skilled in the art will recognize that numerous other configurations could be used that would still fall within the scope of the broad concepts disclosed herein.

It should be further recognized, that although all of the embodiments shown in the figures include stationary aerodynamic configurations, it is entirely possible that moveable tabs could be added to any of the disclosed arrangements for the purpose of aerodynamic trimming.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system of an aircraft, the system comprising: an independent first float configured for attachment to a downwardly-extending structure underneath a first side of the aircraft;
a first aerodynamic structure having upper and lower ends, the lower end of the first aerodynamic structure being mounted on the first float, the upper end of the first aerodynamic structure being unconnected;
an independent second float configured to be attached to a downwardly-extending structure underneath a second side of the aircraft separately from the first float;
a second aerodynamic structure having upper and lower ends, the lower end of the second aerodynamic structure being mounted on the second float, the upper end of the second aerodynamic structure being unconnected; and
the first aerodynamic structure being configured to compensate for aerodynamic imbalances created by the first float; and
the second aerodynamic structure being configured to compensate for aerodynamic imbalances created by incorporation of the second float onto the aircraft.

2. The system of claim 1 wherein the first float and first aerodynamic structure are symmetrical to the second float and second aerodynamic structure.

3. The system of claim 2 wherein the first and second aerodynamic structures are tapered upward and swept back.

4. The system of claim 1 wherein the first and second aerodynamic structures are one of: (i) vertical fins; (ii) T-shaped; (iii) V-shaped fin pairs on each of the first and second floats; or (iv) single, outwardly-angled fins, one on each of the first and second floats.

5. A system of an aircraft, the system comprising:
a first float and a second float; the first float including a passive aerodynamic structure mounted on an upper rearward surface of the elongated member, the aerodynamic structure having an unconnected upper end and being configured to aerodynamically compensate for an aerodynamic imbalance in one or more of pitch or yaw created by an incorporation of the first float onto a plurality of aircraft designs, the first aerodynamic structure configured to substantially eliminate the aerodynamic imbalance caused by an inherent aerodynamic instability created by an aircraft float in flight; a hydrofoil undersurface configuration on the first float, the undersurface having a bow; a stern; a substantially flat top; upper, inwardly tapered sides; lower sides which are concavely tapered upward and outward from a forward keel; a substantially flat rear; a skeg; and rearwardly converging lower surfaces meeting to meet at a rearward keel; each of the lower sides and lower surfaces configured to reduce drag when the aircraft is moving in water, and to provide lift out of the water during a takeoff, and the second float configured to be oriented substantially parallel to, spaced apart from, and configured to be substantially symmetrical to the first float; the first and second floats each being aerodynamically balanced, and thus installable onto various aircraft without substantially impacting overall aircraft aerodynamic stability.

6. The system of claim 5 wherein the at least one aerodynamic structure on the first float extends upward vertically, and is substantially centered at the rear of the float.

7. The system of claim 5 wherein the at least one aerodynamic structure on the first float includes a pair of outwardly angled structures.

8. The system of claim 7 wherein the outwardly angled structures on the first float extend outward from rear edges of the upper surface.

9. The system of claim 8 wherein:
the first aerodynamic structure on the first float is a first fin angled in a first outboard direction from the first float; and
the second aerodynamic structure on the second float is a second fin being angled in a second outboard direction opposite the first outboard direction.

10. The system of claim 5 wherein the at least one aerodynamic structure on the first float has both a substantially vertical member and a substantially horizontal member.

11. The system of claim 10 wherein the at least one aerodynamic structure on the first float includes a horizontal component configured to compensate for a pitch instability of the aircraft created by the addition of the float to an aircraft.

12. The system of claim 5 wherein the at least one aerodynamic structure on the first float includes at least one fin, the fin being angled to an extent that a balance is created between yaw and pitch instabilities.

13. The system of claim 5 wherein the at least one aerodynamic structure on the first float includes a pair of outwardly-angled fins, the fins being angled upward at an angle creating a balance between yaw and pitch instabilities.

14. The system of claim 5 wherein the at least one aerodynamic structure on the first float is a vertical fin tapered towards the unconnected upper end.

15. A float system of aircraft, the system comprising: one or more elongated members, each of said members having an undersurface configuration for engaging water; the one or more elongated members being mountable onto one or more downwardly-extending structures on the aircraft such that the one or more elongated members are in parallel with a flight direction of the aircraft; the one or more elongated members each creating an imbalance in pitch or yaw in the elongated member; an aerodynamic structure mounted on an exterior surface at the rear of each of the one or more elongated members, each aerodynamic structure having a base where the aerodynamic structure is mounted onto the exterior surface and an upper end, the upper end being free from any connection, the aerodynamic structure being configured to compensate for the imbalance in pitch or yaw created by each of the one or more elongated members.

16. The system of claim 15 wherein the aerodynamic structures configure the one or more floats such that an one or more floats are usable on a variety of aircraft.

17. The system of claim 15 wherein each aerodynamic structure substantially compensates for yaw instabilities.

18. The system of claim 15 wherein each aerodynamic structure has a V-shaped configuration and substantially compensates for both pitch and yaw instabilities.

* * * * *